Patented Oct. 20, 1931

1,828,211

UNITED STATES PATENT OFFICE

AUGUST WOLFSHOLZ, OF MILAN, ITALY, ASSIGNOR TO STETTINER CHAMOTTE-FABRIK ACTIEN-GESELLSCHAFT VORMALS DIDIER, OF BERLIN-WILMERSDORF, GERMANY, A CORPORATION OF GERMANY

FIRE AND ACID PROOF PLASTIC SUBSTANCE

No Drawing. Application filed September 8, 1925, Serial No. 55,164, and in Germany December 21, 1924.

This invention relates to a plastic substance for producing fire-proof articles, facings and the like out of highly refractory minerals.

In hitherto known substances of this kind organic cements such as casein or the like, which carbonize and burn under the influence of heat, have been employed as binding agents. Alkaline binding agents such as waterglass and borax and glass fluxes have also been employed, and these tend to reduce the melting point of the articles. It has also been proposed to use a powder of thorium oxide, a cerium salt and a soluble salt of thorium, the latter serving as a binding agent, the mixture being formed into a paste by the addition of a liquid which is not in itself a binding agent. Other methods are known wherein zirconium oxide and rare earths are made into a paste which is treated with colloidial hydroxide of one or more of these metals together with a small quantity of free acid, or with a decomposing solution of the substances. It is also known to bind zirconium oxide with phosphoric acid; however, a plastic mass formed with the aid of phosphoric acid requires about a month's time for setting and drying, and must be very carefully handled before burning as it crumbles easily.

In accordance with my invention, I produce a refractory substance by mixing a highly refractory mineral with a binding agent obtained by dissolving a salt or salts in the corresponding acid or acids, preferably to saturation. When the substance produced in this manner is moulded or applied as a coating and then heated, an article or coating is obtained which is very resistant to high temperatures, to sudden chilling in cold water, and to the action of acids and alkalies.

Contrasted with known plastic substances, composed of a refractory material mixed with an acid, for example, phosphoric acid, the substances produced in accordance with the present invention possess great adhesive power and dry quickly; they also do not require a long time for setting or hardening and objects moulded therefrom can stand rough handling before the burning or baking operation. The binding agent of my novel composition enters into combination with the highly refractory material on heating without reducing the melting point of the mass to any appreciable extent. This presents a material advantage over mixtures containing water glass or similar compounds, which greatly reduce the melting point of the refractory material.

The binding agent may be produced in various ways. For instance any suitable salt obtained from alkaline earths is dissolved in the corresponding acid, i. e., phosphoric acid in the case of a phosphate; sulphuric acid in the case of a sulphate and so on. For instance calcium phosphate may be stirred into phosphoric acid until the solution is saturated. If magnesium phosphate is used, a small quantity of an ammonia compound must be added in order to effect a solution of the salt. Still greater adhesiveness is obtained from a saturated solution of aluminum phosphate in phosphoric acid. As an example, the binding agent may be made up of 100 parts of 50% phosphoric acid in which 60 parts of aluminum phosphate are dissolved. This produces a sticky, viscous binding agent which can be thinned down according to requirements. Sulphuric acid and calcium sulphate will also form a good binding agent. Mixtures of different salts are dissolved in mixtures of the corresponding acids.

The highly refractory material, for example, a rare earth compound such as zirconium oxide is triturated, mixed with the binding agent and moulded into shapes, which after drying (which is not always necessary) are baked at a temperature of 800°–1000° C. A reaction takes place at this temperature, the acid being driven out and the refractory oxide or other compound of the rare earth elements, such as zirconium, combining with the base of the binding agent to form a new substance. In the case of zirconium oxide a zirconate is produced which has the same valuable properties as the oxide itself—i. e., is highly refractory, free from pores, and does not crack even when repeatedly chilled in cold water.

The binding agent according to the present invention may be combined with various refractory materials to produce a plastic composition for use as a mortar or as a facing or coating for fire bricks, retorts, etc. It may further be used to protect metal from the influence of high temperatures. For instance a 1 or 2 cm. thick coating of binding agent mixed with zirconium oxide will serve as an effective protection for ordinary fire bricks, burned out retorts and metal walls. The resistance of the coating is so great that even molten slag leaves no impression on it, a circumstance which is of great importance in the case of furnaces stoked with coal dust.

Apart from fire bricks and facings, gas burner nipples and various other articles subjected to the influence of heat and ashes, may be advantageously made out of the substance. Vessels of metal, glass or earthenware for domestic and chemical purposes may be coated with the substance which has a high specific heat and which is a bad heat conductor. The substance can be used with advantage in buildings and the like as an insulation against heat and cold, and it is also a non-conductor of electric current and therefore suitable for use in electric switches, sparking-plugs and the like. It can be used in grinding and milling stones and for protecting tunnels from the influence of acid water and gases. It can also be used as a filler for repairing faulty castings, which are subjected to strong heating or are exposed to the action of acids or alkalies.

The mineral cement according to the invention can also be produced out of acid salts.

By the term "highly refractory mineral" as used in the claims is meant one which will not soften or melt at the temperatures usually present in retorts, furnaces, etc.—i. e., one having a melting point above 1800° C.

The term "light metal" is to be understood to include the metals of relatively low atomic weight—e. g. calcium, magnesium, aluminum, etc.

The cement can be delivered in dry condition and mixed with water for use.

I claim:

1. A plastic fire-proof material comprising zirconium oxide and a solution of magnesium phosphate in phosphoric acid containing an ammonium compound.

2. The method of producing a fire-proof material which comprises mixing zirconium oxide with a solution of magnesium phosphate in phosphoric acid containing an ammonium compound.

3. A plastic fire-proof material comprising an oxide of the group consisting of zirconium and thorium and a phosphate of a metal of the group consisting of magnesium, aluminum and calcium in solution in phosphoric acid.

4. A plastic fire-proof material comprising thorium oxide and a solution of a soluble phosphate from the group consisting of magnesium, aluminum and calcium, in phosphoric acid.

5. A plastic fire-proof material comprising zirconium oxide and a solution of a soluble phosphate from the group consisting of magnesium, aluminum and calcium, in phosphoric acid.

AUGUST WOLFSHOLZ.